US009123934B2

(12) United States Patent
Liang et al.

(10) Patent No.: US 9,123,934 B2
(45) Date of Patent: Sep. 1, 2015

(54) PORTABLE ELECTRONIC DEVICE AND BATTERY FIXING MECHANISM

(71) Applicant: Wistron Corporation, New Taipei (TW)

(72) Inventors: Jyun-Shuo Liang, New Taipei (TW);
Chu-Cheng Yang, New Taipei (TW);
Ming-Lun Liu, New Taipei (TW);
Yu-Sheng Lin, New Taipei (TW);
Hung-Li Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 334 days.

(21) Appl. No.: 13/892,294

(22) Filed: May 12, 2013

(65) Prior Publication Data
US 2014/0079973 A1 Mar. 20, 2014

(30) Foreign Application Priority Data

Sep. 17, 2012 (TW) .............................. 101134064 A

(51) Int. Cl.
*H01M 2/10* (2006.01)
*H04M 1/02* (2006.01)
(52) U.S. Cl.
CPC .......... *H01M 2/1022* (2013.01); *H04M 1/0262* (2013.01); *H01M 2220/30* (2013.01)
(58) Field of Classification Search
CPC ................................................... H01M 2/1022
See application file for complete search history.

(56) References Cited

U.S. PATENT DOCUMENTS

| 2006/0012332 | A1* | 1/2006 | Peng | 320/107 |
| 2008/0025010 | A1* | 1/2008 | Zick et al. | 361/807 |
| 2008/0268329 | A1* | 10/2008 | Mackle et al. | 429/97 |
| 2008/0311467 | A1* | 12/2008 | Nishimaki et al. | 429/96 |
| 2010/0026609 | A1* | 2/2010 | Otsuki et al. | 345/8 |
| 2010/0151305 | A1* | 6/2010 | Ouyang | 429/97 |
| 2011/0269004 | A1* | 11/2011 | Chang et al. | 429/97 |
| 2012/0069966 | A1* | 3/2012 | Kobayashi | 378/189 |

* cited by examiner

*Primary Examiner* — Ula C Ruddock
*Assistant Examiner* — Scott J Chmielecki
(74) *Attorney, Agent, or Firm* — Winston Hsu; Scott Margo

(57) ABSTRACT

A portable electronic device includes a main body, a battery, and a battery fixing mechanism including a button disposed through a button hole of the main body, first and second rod members, a first linkage rod pivoted to the first rod member and disposed in an oblique slot of the button, first and second transverse elastic members, and a rail member having transverse, oblique, and incurve rails. When a protruding rod of the first rod member moves in the transverse, oblique, or incurve rail, the rail member moves longitudinally to make the first rod member move transversely to be engaged with or separated from a first fixing hole of the battery. The first and second transverse elastic members are respectively disposed on the first and second rod members. The second rod member abuts against the first rod member for pushing the first rod member when the button is pressed.

12 Claims, 9 Drawing Sheets

PORTABLE ELECTRONIC DEVICE AND BATTERY FIXING MECHANISM

BACKGROUND OF THE INVENTION

1. Field of the Invention

The present invention relates to a portable electronic device and a battery fixing mechanism thereof, and more specifically, to a portable electronic device utilizing a protruding rod of a rod member to move along a rail member so as to make a button retracted in a button hole of a main body and a battery fixing mechanism.

2. Description of the Prior Art

In general, a battery fixing mechanism of a conventional portable electronic device (e.g. a notebook) usually includes a battery slot formed at a bottom or a rear end of the portable electronic device for containing a battery, and further includes two telescopic hooks disposed at two sides of the battery slot respectively and two push buttons connected to the two telescopic hooks respectively for driving the two telescopic hooks to be engaged with or disengaged from corresponding fixing holes on the battery. In such a manner, when a user wants to detach or replace the battery, the user needs to use his two hands to push the two push buttons for driving the two telescopic hooks to be disengaged from the fixing holes of the battery, so that the user could detach the battery from the battery slot. However, since the aforesaid design requires the user to perform the battery detaching operation with his two hands, the aforesaid design causes the user much inconvenience in operating the portable electronic device.

Although the aforesaid problem could be further solved by the design of utilizing one press button to drive the two telescopic hooks, this design may further result in a complicated linkage mechanism between the press button and the telescopic hooks, and may make the user easily touch the press button while operating or carrying the portable electronic device so as to cause a problem that the battery may be accidentally separate from the portable electronic device.

SUMMARY OF THE INVENTION

The present invention provides a portable electronic device including a main body, a battery, and a battery fixing mechanism. The main body has a button hole. The battery is detachably disposed at a side of the main body and has a first fixing hole and a second fixing hole. The battery fixing mechanism includes a button, a rail member, a first rod member, a first linkage rod, a first transverse elastic member, a second rod member, and a second transverse elastic member. The button is movably disposed through the button hole of the main body and has an oblique slot formed therein and an inclined-surface end. The rail member is movably disposed in the main body in a longitudinal direction and has a transverse rail, an oblique rail, and an incurve rail. The first rod member is movably disposed in the main body corresponding to the rail member and has a protruding rod. The protruding rod inserts into the rail member. The rail member moves longitudinally to make the first rod member move transversely to be engaged with or disengaged from the first fixing hole when the protruding rod moves in the transverse rail, the oblique rail, or the incurve rail. The first linkage rod is pivoted to the first rod member and movably disposed in the oblique slot for being positioned in the oblique slot when the button is pressed to make the protruding rod engaged with the incurve rail. The first transverse elastic member is disposed on the first rod member for providing elastic force to the first rod member to drive the protruding rod from the transverse rail to be engaged with the incurve rail, so as to make the button retracted in the button hole or move back to the transverse rail along the oblique rail. The second rod member has an inclined-surface portion and abuts against the first rod member. The inclined-surface end slidably cooperates with the inclined-surface portion to make the second rod member move transversely to be engaged with or disengaged from the second fixing hole. The second rod member pushes the first rod member to make the protruding rod move along the transverse rail or from the incurve rail to the inclined rail. The second transverse elastic member is disposed on the second rod member for providing the second rod member with elastic force so as to drive the second rod member to be engaged with the second fixing hole.

The present invention further provides a battery fixing mechanism for a portable electronic device. The portable electronic device includes a main body and a battery. The main body has a button hole. The battery is detachably disposed at a side of the main body and has a first fixing hole and a second fixing hole. The battery fixing mechanism includes a button, a rail member, a first rod member, a first linkage rod, a first transverse elastic member, a second rod member, and a second transverse elastic member. The button is movably disposed through the button hole of the main body and has an oblique slot formed therein and an inclined-surface end. The rail member is movably disposed in the main body in a longitudinal direction and has a transverse rail, an oblique rail, and an incurve rail. The first rod member is movably disposed in the main body corresponding to the rail member and has a protruding rod. The protruding rod inserts into the rail member. The rail member moves longitudinally to make the first rod member move transversely to be engaged with or disengaged from the first fixing hole when the protruding rod moves in the transverse rail, the oblique rail, or the incurve rail. The first linkage rod is pivoted to the first rod member and movably disposed in the oblique slot for being positioned in the oblique slot when the button is pressed to make the protruding rod engaged with the incurve rail. The first transverse elastic member is disposed on the first rod member for providing elastic force to the first rod member to drive the protruding rod from the transverse rail to be engaged with the incurve rail, so as to make the button retracted in the button hole or move back to the transverse rail along the oblique rail. The second rod member has an inclined-surface portion and abuts against the first rod member. The inclined-surface end slidably cooperates with the inclined-surface portion to make the second rod member move transversely to be engaged with or disengaged from the second fixing hole. The second rod member pushes the first rod member to make the protruding rod move along the transverse rail or from the incurve rail to the inclined rail. The second transverse elastic member is disposed on the second rod member for providing the second rod member with elastic force so as to drive the second rod member to be engaged with the second fixing hole.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
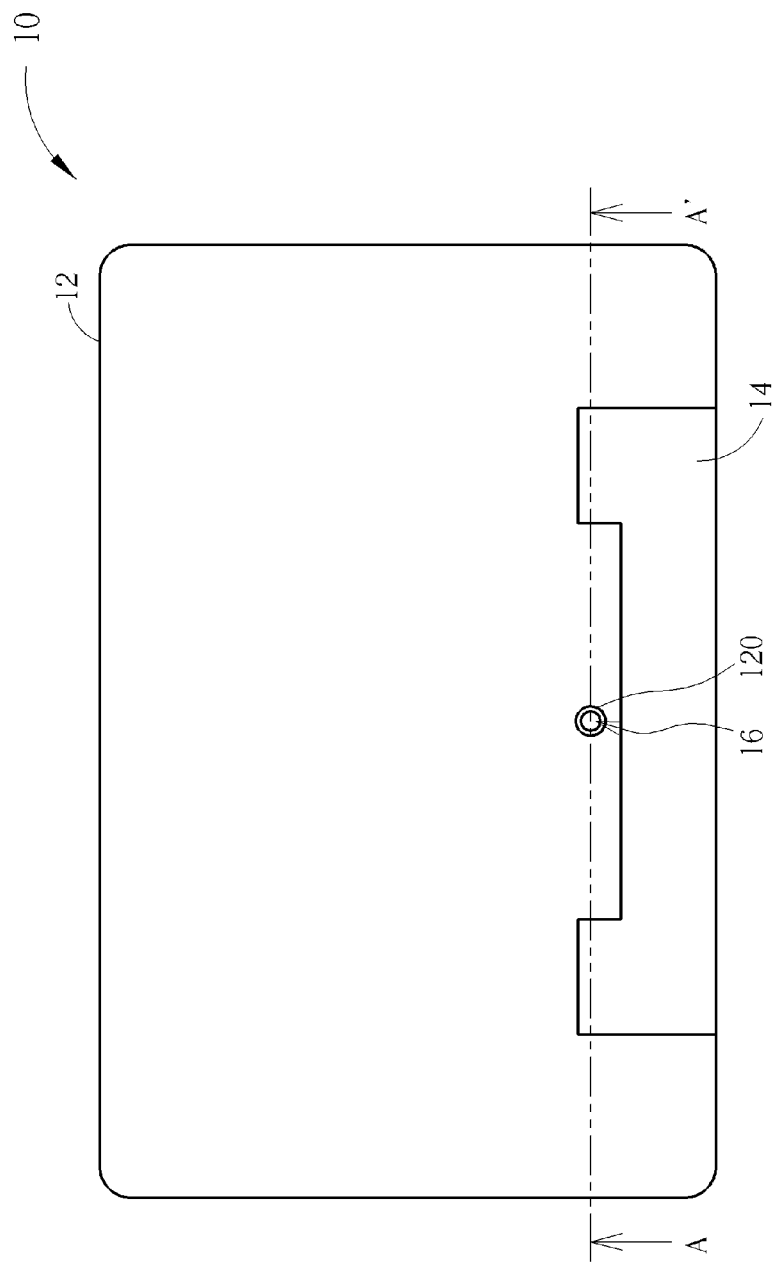
FIG. 1 is a bottom view of a portable electronic device according to an embodiment of the present invention.
Figure 2:
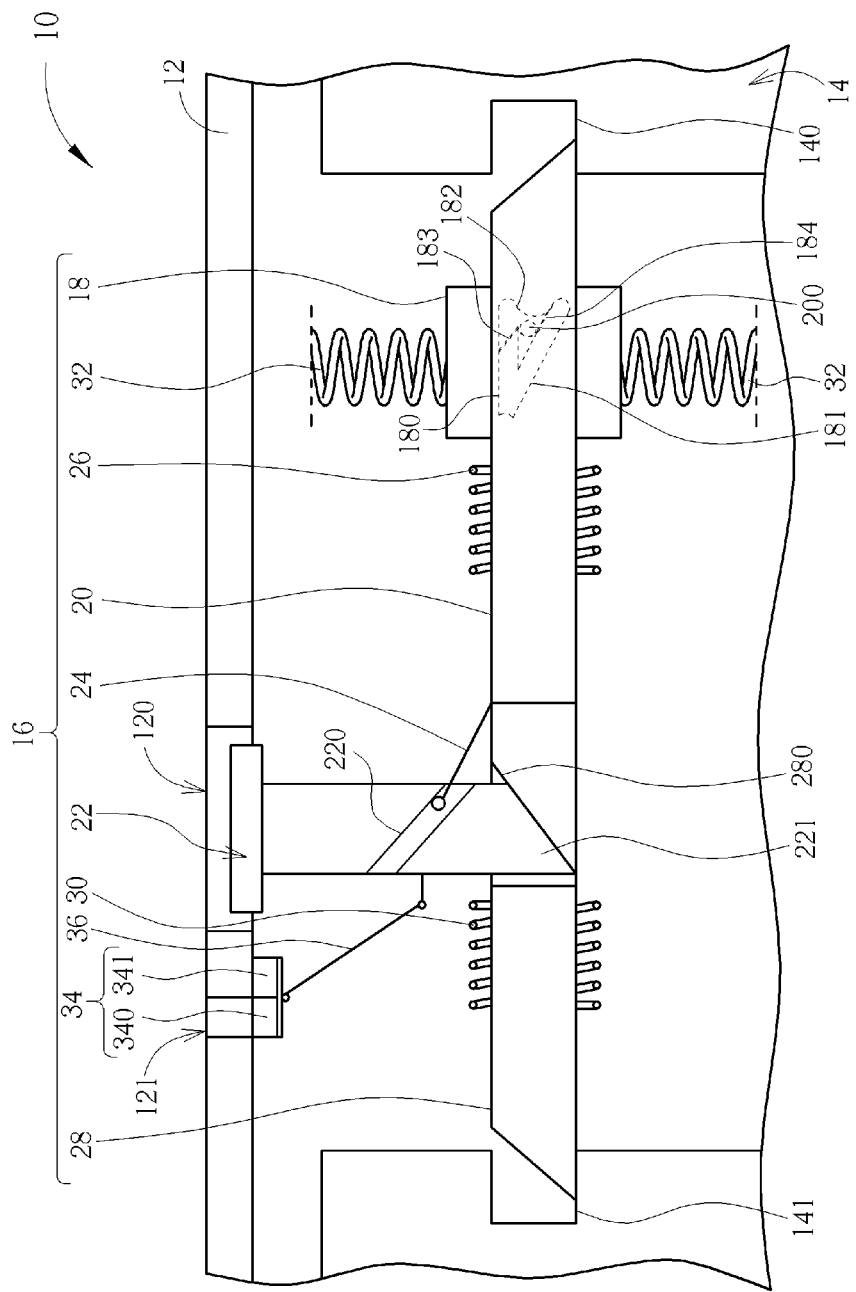
FIG. 2 is a sectional diagram of the portable electronic device in FIG. 1 along a sectional line A-A'.

Please refer to FIG. 1 and FIG. 2. FIG. 1 is a bottom view of a portable electronic device 10 according to an embodiment of the present invention. FIG. 2 is a sectional diagram of the portable electronic device 10 in FIG. 1 along a sectional line A-A'. In this embodiment, the portable electronic device 10 is a notebook, but not limited thereto, meaning that the portable electronic device 10 could also be other portable electronic apparatus (e.g. a tablet computer). As shown in FIG. 1 and FIG. 2, the portable electronic device 10 includes a main body 12, a battery 14, and a battery fixing mechanism 16. The main body 12 has a button hole 120 and includes major components of a conventional portable electronic device, such as a casing, a keyboard, a motherboard, a central processing unit, and the related description for the major components is omitted herein since it is commonly seen in the prior art. The battery 14 is detachably disposed at a side of the main body 12 and has a first fixing hole 140 and a second fixing hole 141. The battery 14 is used for providing electrical energy for operations of the main body 12.

Figure 3:
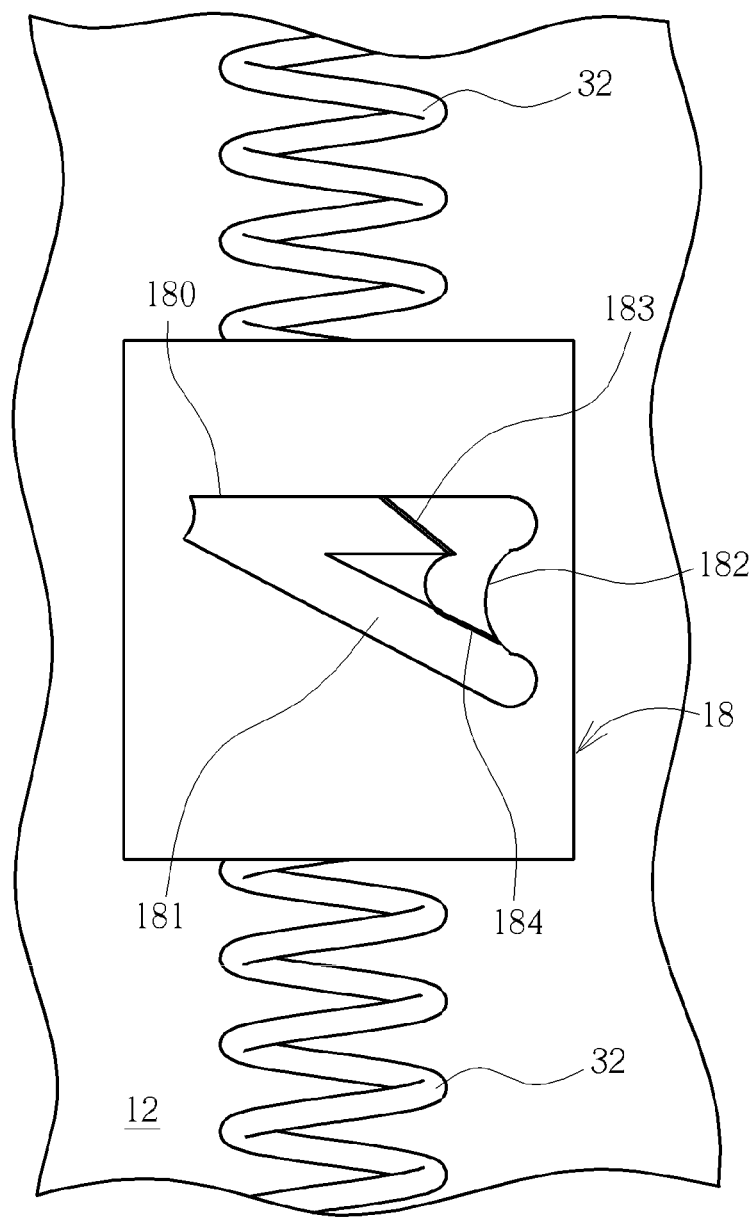
FIG. 3 is diagram of a rail member in FIG. 2 being disposed in a main body.
Figure 4:
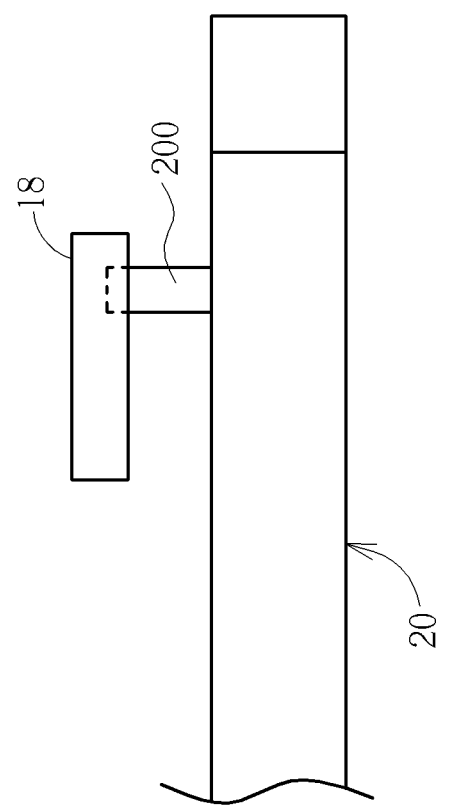
FIG. 4 is a partial bottom view of a protruding rod of a first rod member in FIG. 2 inserting into the rail member.

More detailed description for each component of the battery fixing mechanism 16 is provided as follows. Please refer to FIG. 2, FIG. 3, and FIG. 4. FIG. 3 is a diagram of a rail member 18 in FIG. 2 being disposed in the main body 12. FIG. 4 is a partial bottom view of a protruding rod 200 of a first rod member 20 in FIG. 2 inserting into the rail member 18. As shown in FIG. 2, FIG. 3, and FIG. 4, the battery fixing mechanism 16 includes the rail member 18, the first rod member 20, a button 22, a first linkage rod 24, a first transverse elastic member 26, a second rod member 28, and a second transverse elastic member 30. The button 22 is movably disposed through the button hole 120 and has an oblique slot 220 formed therein. The rail member 18 is movably disposed in the main body 12 in a longitudinal direction and has a transverse rail 180, an oblique rail 181, and an incurve rail 182 which are communicated with each other. In this embodiment, the battery fixing mechanism 16 utilizes elastic force provided by at least one elastic member to make the rail member 18 movable in the main body 12 in a longitudinal direction. For example, as shown in FIG. 3, the battery fixing mechanism 16 could further include two longitudinal elastic members 32 (but not limited thereto). The two longitudinal elastic members 32 are disposed on top and bottom ends of the rail member 18 respectively for providing elastic force to make the rail member 18 capable of moving upward and downward relative to the main body 12 steadily with transverse movement of the first rod member 20. To be noted, the design that the rail member 18 could be movable in the main body 12 in a longitudinal direction is not limited to the aforesaid embodiment. That is to say, in other embodiment, a longitudinal slot could be formed in the main body 12 and the rail member 18 is movably disposed in the longitudinal slot, so that the rail member 18 could also be movable in the main body 12 in a longitudinal direction.

As shown in FIG. 2 and FIG. 4, the first rod member 20 is movably disposed in the main body 12 corresponding to the rail member 18 and has the protruding rod 200. The protruding rod 200 is used for inserting into the rail member 18 so that the protruding rod 200 could move along the transverse rail 180, the oblique rail 181, and the incurve rail 182. Accordingly, when the protruding rod 200 moves in the transverse rail 180, the oblique rail 181, or the incurve rail 182, the rail member 18 could move longitudinally to make the first rod member 20 move transversely to be engaged with or disengaged from the first fixing hole 140 of the battery 14. The first linkage rod 24 is pivoted to the first rod member 20 and movably disposed in the oblique slot 220 for being positioned in the oblique slot 220 when the button 22 is pressed to make the protruding rod 200 engaged with the incurve rail 182. The first transverse elastic member 26 is disposed on the first rod member 20 for providing the first rod member 20 with elastic force to drive the protruding rod 200 from the transverse rail 180 to be engaged with the incurve rail 182, so as to make the button 22 retracted in the button hole 120 or move back to the transverse rail 180 along the oblique rail 181.

In this embodiment, the battery fixing mechanism 16 utilizes linkage of the second rod member 28 and the button 22 to make the second rod member 28 engaged with or disengaged from the second fixing hole 141 of the battery 14 with movement of the button 22. To be more specific, the second rod member 28 has an inclined-surface portion 280 and abuts against the first rod member 20, and the button 22 has a corresponding inclined-surface end 221. The inclined-surface end 221 slidably cooperates with the inclined-surface portion 280 (as shown in FIG. 2) to drive the second rod 28 to move transversely to be engaged with or disengaged from the second fixing hole 141. Furthermore, the second transverse elastic member 30 is disposed on the second rod member 28 for providing the second rod member 28 with elastic force to drive the second rod member 28 to be engaged with the second fixing hole 141.

Furthermore, for achieving the purpose that a user could clearly know whether the battery 14 is fixed to the main body 12, in this embodiment, an opening 121 could be formed at a side of the button hole 120 on the main body 12, and the battery fixing mechanism 16 could further include a slide block 34 and a second linkage rod 36. The slide block 34 is slidably disposed in the main body 12 corresponding to opening 121 and has first section 340 and the second section 341. The second linkage rod 36 is pivoted to the button 22 and the slide block 34 respectively for driving the slide block 34 from a position where the first section 340 is aligned with the opening 121 back to the second section 341 is aligned with the opening 121 when the button 22 moves relative to the button hole 120 to make the protruding rod 200 move toward the incurve rail 182 along the transverse rail 180 or move toward the transverse rail 180 along the oblique rail 181 for driving the first rod member 20 and the second rod 22 to be disengaged from the first fixing hole 140 and the second fixing hole 141 of the battery 14 respectively. In such a manner, the user could clearly know whether the battery 14 is fixed to the main body 12. For example, when the first section 340 (assuming that the first section 340 is a red section) is aligned with the opening 121, the user could know that the battery is currently fixed to the main body 12 via the battery fixing mechanism 16. On the other hand, when the second section 341 (assuming that the second section 341 is a green section) is aligned with the opening 121, the user could know that the battery 14 is currently in a detachable state.

Furthermore, the rail member 18 could further have a first blocking part 183 and a second blocking part 184. The first blocking part 183 is disposed at a position where the transverse rail 180 is communicated with the incurve rail 182 for preventing the protruding rod 200 from moving back to the transverse rail 180. The second blocking part 184 is disposed at a position where the incurve rail 182 is communicated with the oblique rail 181 for preventing the protruding rod 200 from moving back to the incurve rail 182. The first blocking part 183 and the second blocking part 184 could be an oblique blocking sheet respectively, but not limited there. That is, all blocking structural designs for preventing the protruding rod 200 from moving back to the transverse rail 180 or the incurve rail 182 could be utilized by the present invention. For example, in other embodiment, the battery fixing mechanism 16 could utilize a protruding point formed at a position where the incurve rail 182 is communicated with the oblique rail 181 to prevent the protruding rod 200 from moving back to the incurve rail 182.

Figure 5:
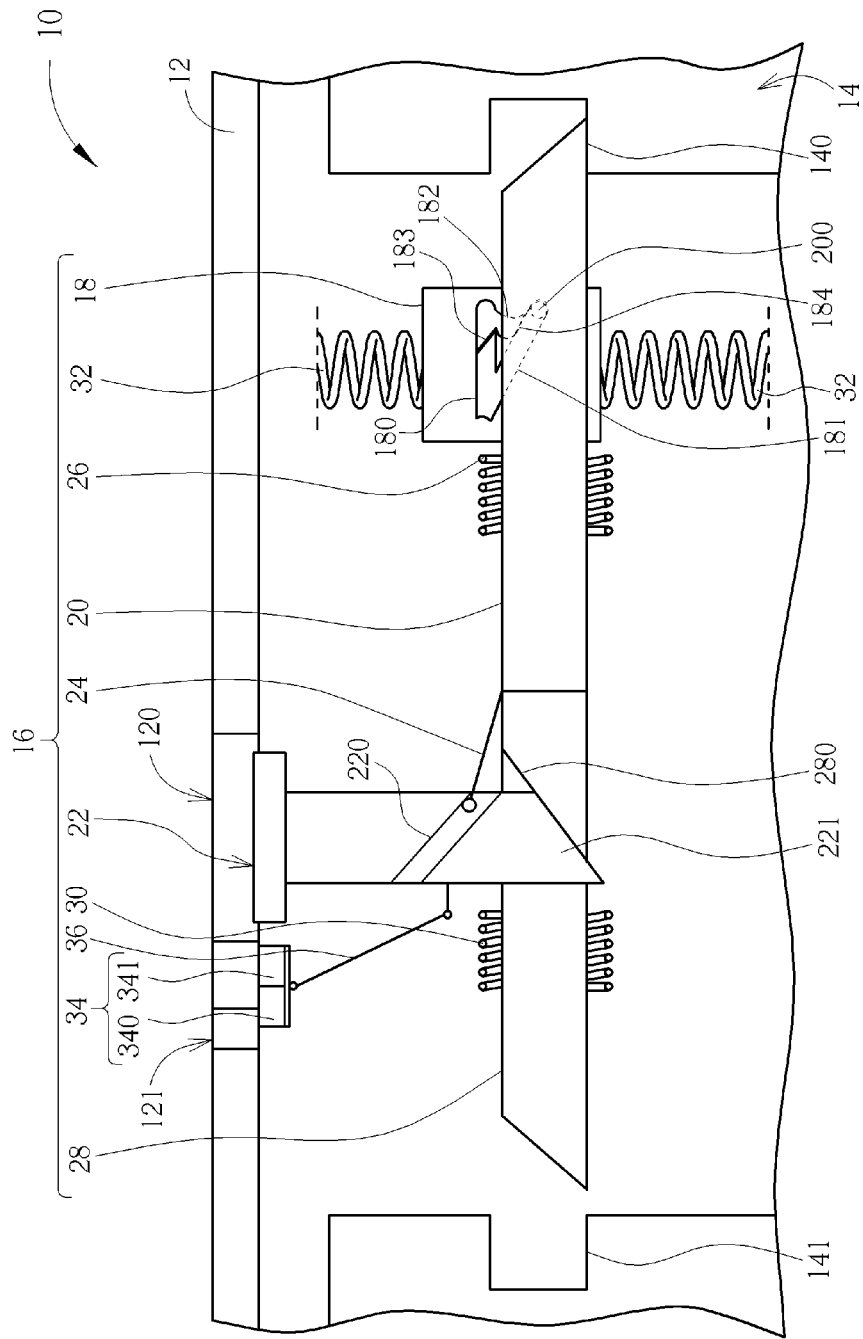
FIG. 5 is a sectional diagram of a protruding rod in FIG. 2 moving from an incurve rail to an oblique rail.
Figure 6:
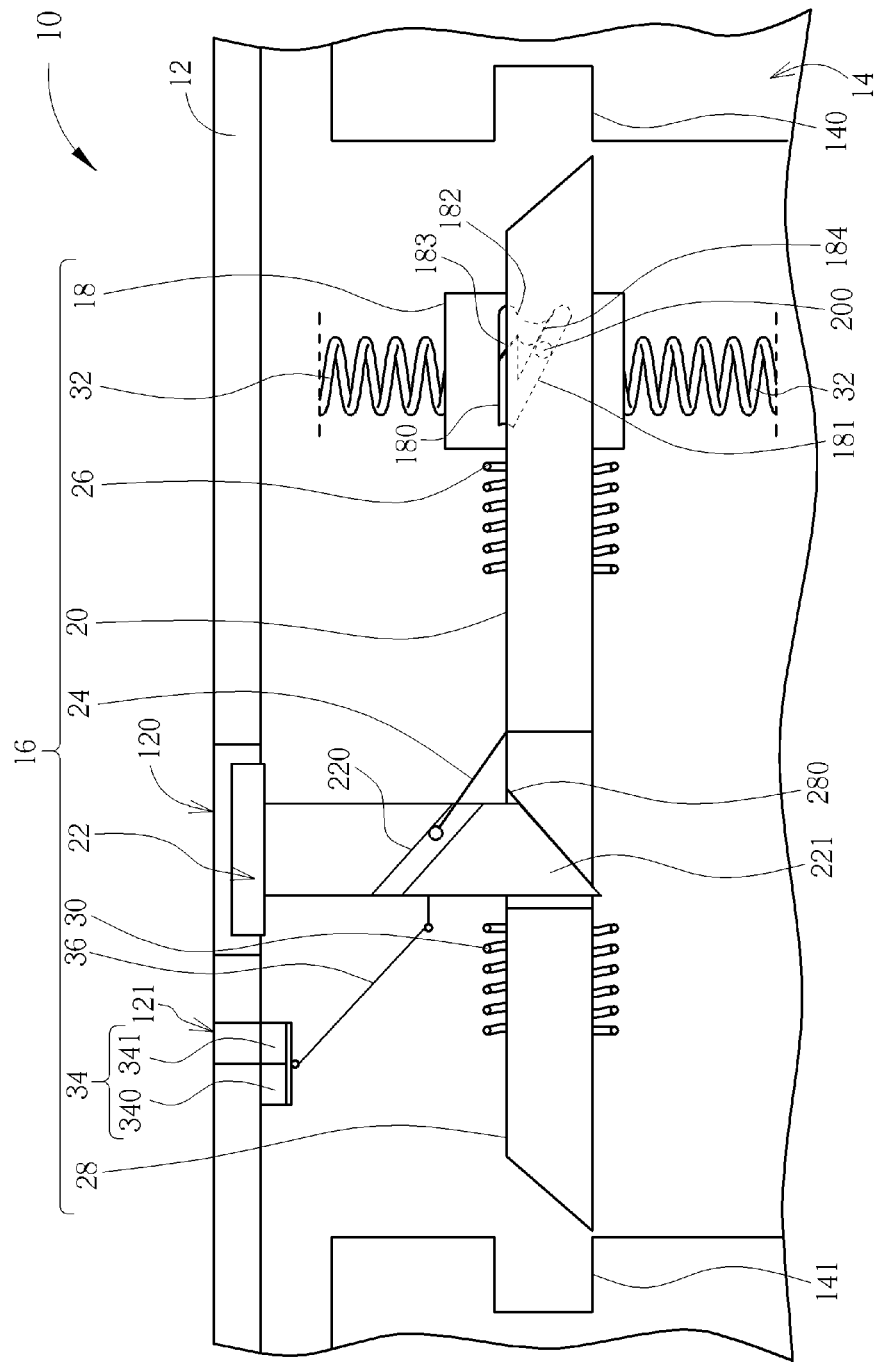
FIG. 6 is a sectional diagram of the protruding rod in FIG. 5 moving toward a transverse rail along the oblique rail to make the first rod member and a second rod member to be disengaged from a first fixing hole and a second fixing hole respectively.
Figure 7:
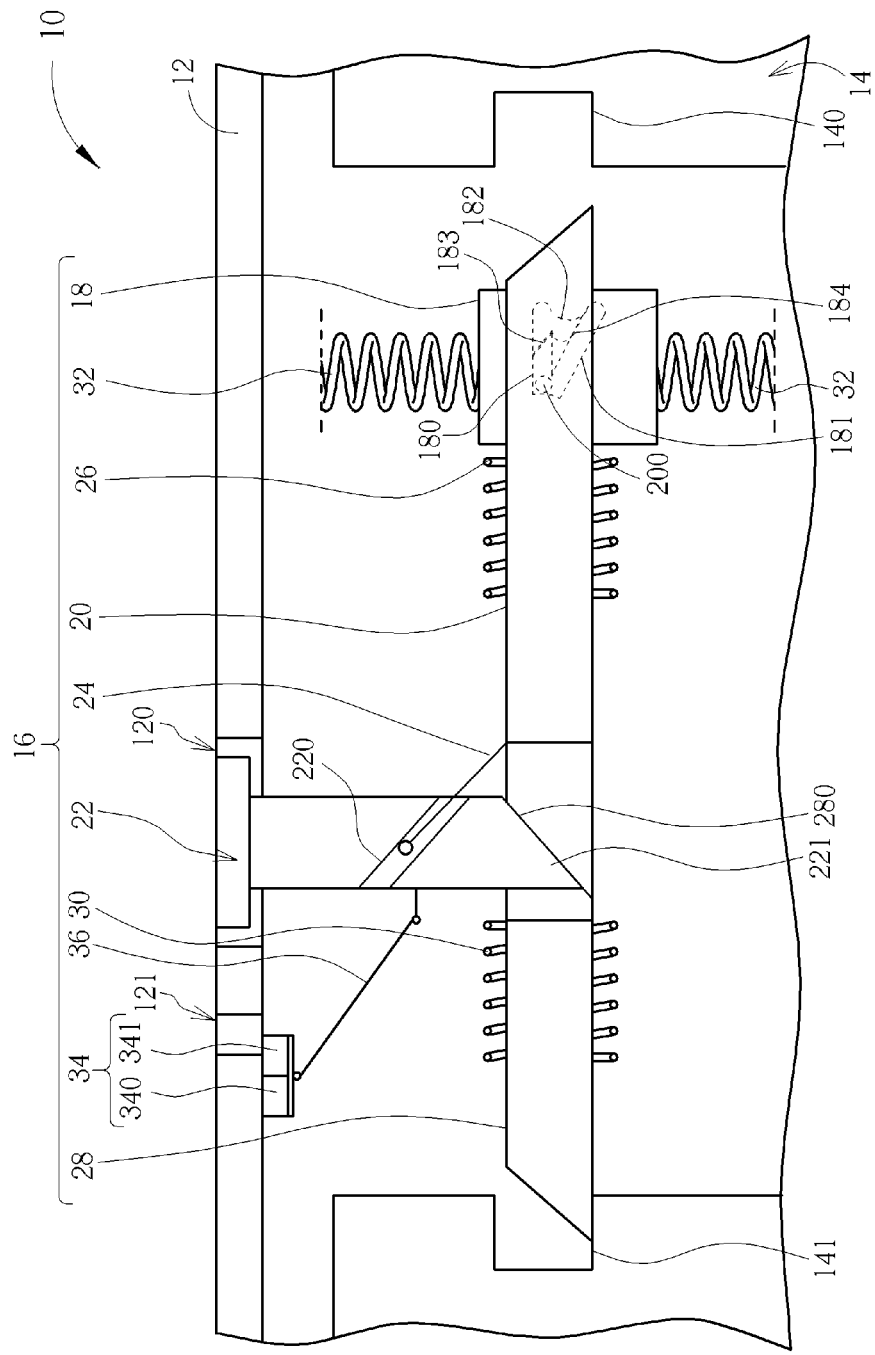
FIG. 7 is a sectional diagram of the protruding rod in FIG. 6 moving from the oblique rail to the transverse rail.
Figure 8:
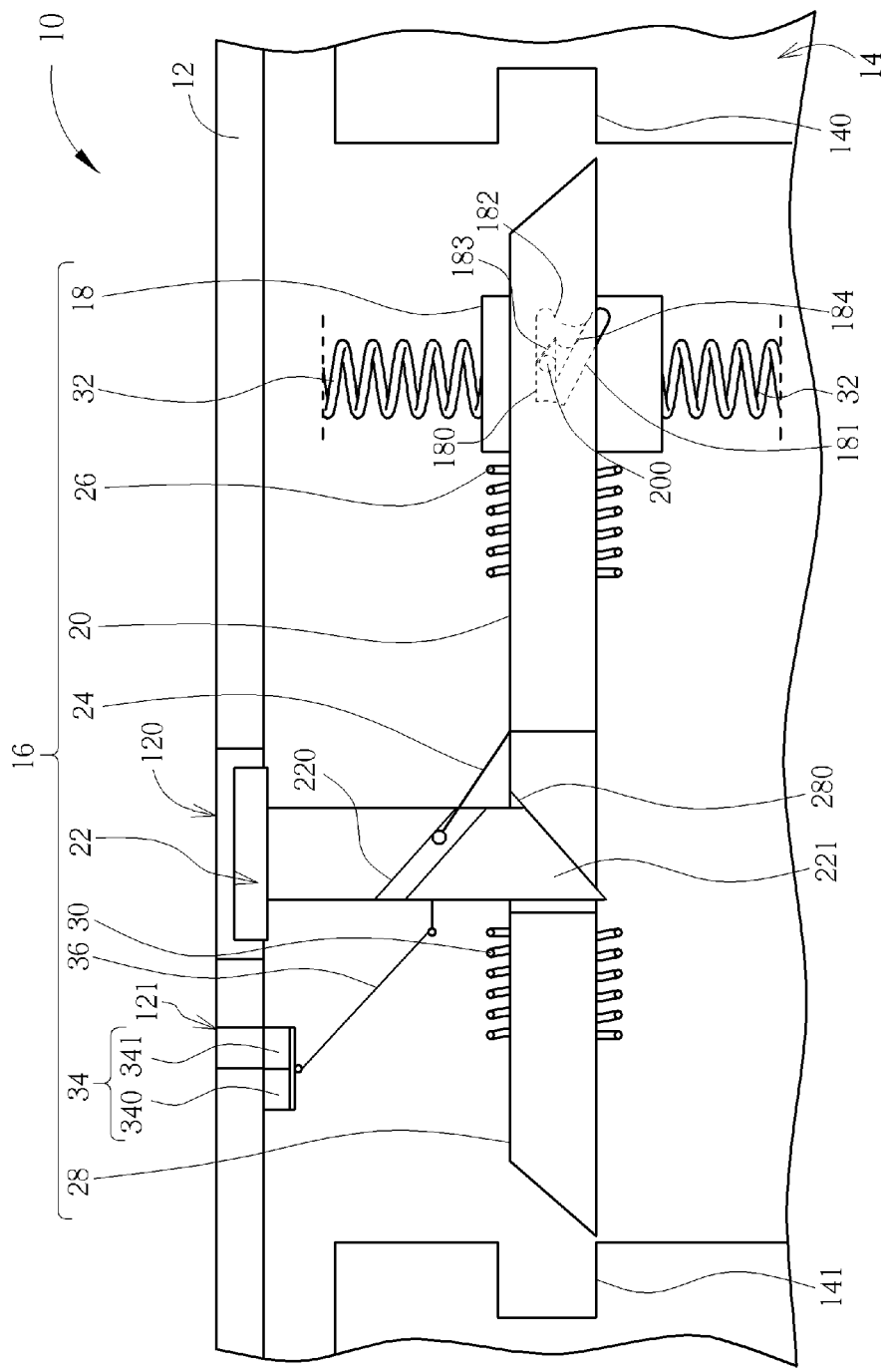
FIG. 8 is a sectional diagram of the protruding rod in FIG. 7 moving toward the incurve rail along the transverse rail to make first rod member and the second rod member to be disengaged from the first fixing hole and the second fixing hole respectively.
Figure 9:
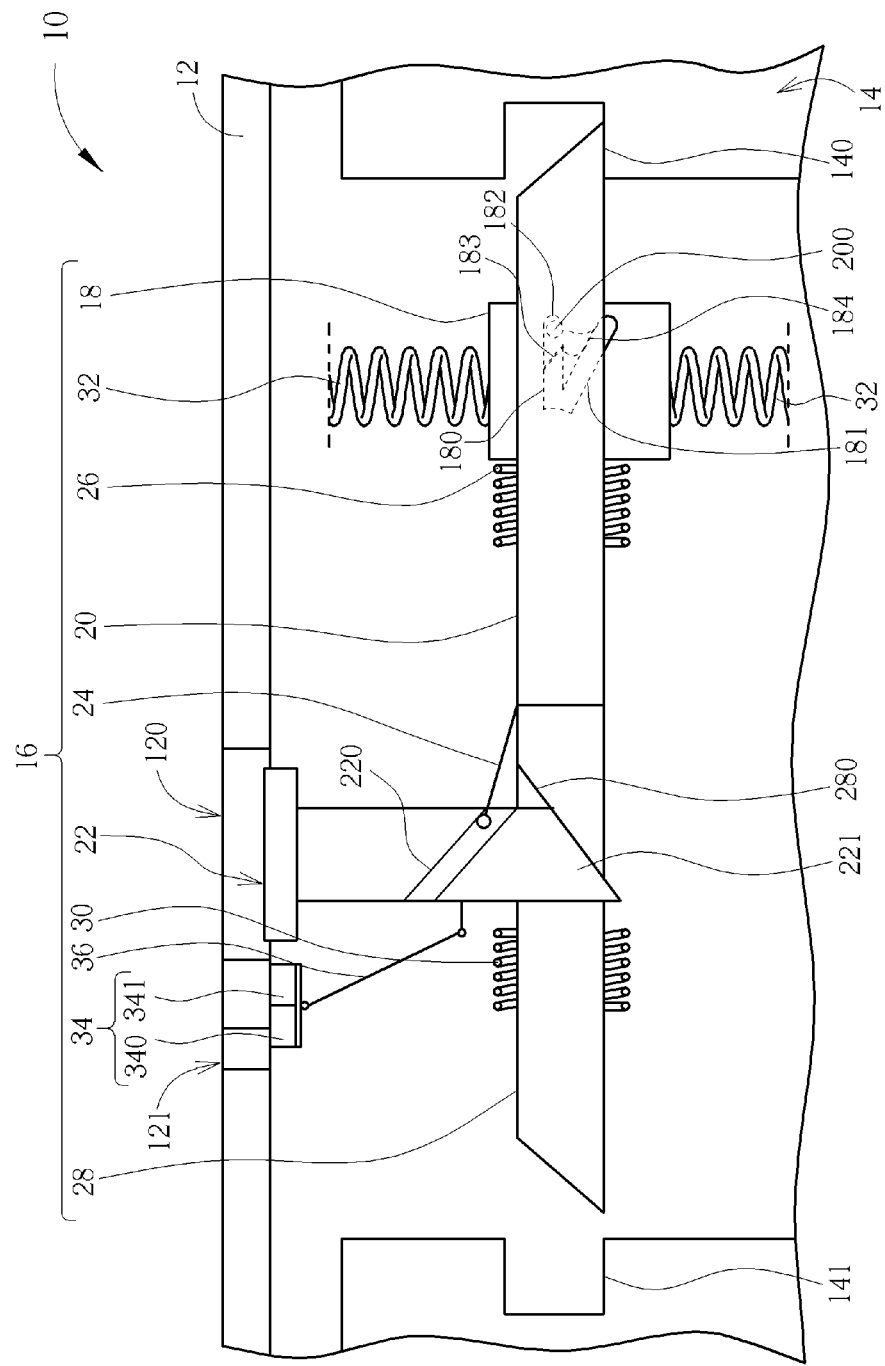
FIG. 9 is a sectional diagram of the protruding rod in FIG. 8 moving from the transverse rail to the incurve rail.

In the following, the battery detaching operation of the portable electronic device 10 is described in detail. Please refer to FIG. 2, FIG. 5, FIG. 6, FIG. 7, FIG. 8, and FIG. 9. FIG. 5 is a sectional diagram of the protruding rod 200 in FIG. 2 moving from the incurve rail 182 to the oblique rail 181. FIG. 6 is a sectional diagram of the protruding rod 200 in FIG. 5 moving toward the transverse rail 180 along the oblique rail 181 to make the first rod member 20 and the second rod member 28 to be disengaged from the first fixing hole 140 and the second fixing hole 141 respectively. FIG. 7 is a sectional diagram of the protruding rod 200 in FIG. 6 moving from the oblique rail 181 to the transverse rail 180. FIG. 8 is a sectional diagram of the protruding rod 200 in FIG. 7 moving toward the incurve rail 182 along the transverse rail 180 to make first rod member 20 and the second rod member 28 to be disengaged from the first fixing hole 140 and the second fixing hole 141 respectively. FIG. 9 is a sectional diagram of the protruding rod 200 in FIG. 8 moving from the transverse rail 180 to the incurve rail 182.

When the user wants to detach the battery 14 for charging or replacing the battery 14, the user just needs to press the button 22 as shown in FIG. 2. At this time, with downward movement of the button 22, the second rod member 28 could move to a position as shown in FIG. 5 by the inclined-surface portion 280 of the second rod member 28 slidably cooperating with the inclined-surface end 221 of the button 22, wherein the second transverse elastic member 30 is in a compressed state. Furthermore, via the design in which the second rod member 28 abuts against the first rod member 20, the first rod member 20 could be pushed by the second rod member 28 to insert into the first fixing hole 140 of the battery 14 with movement of the second rod member 28 toward a position as shown in FIG. 5. During the aforesaid process, the rail member 18 could move upward correspondingly to make the protruding rod 200 of the first rod member 20 move past the second blocking part 184 from the incurve rail 182, so as to move to a position where the protruding rod 200 abuts against the oblique rail 181 (as shown in FIG. 5), wherein the first transverse elastic member 26 is in a compressed state.

Subsequently, the user could gradually reduce the pressing force, so that the elastic force of the first transverse elastic member 26 could drive the first rod member 20 to be disengaged from the first fixing hole 140 and the elastic force of the second transverse elastic member 30 could drive the second rod member 20 to insert into the second fixing hole 141. At this time, the protruding rod 200 could move along the oblique rail 181 from the position as shown in FIG. 5 with movement of the first rod member 20, and the button 22 could move upward with transverse movement of the second rod member 28. When the protruding rod 200 moves to the position as shown in FIG. 6 where the second rod member 28 has not inserted into the second fixing hole 141 and the first rod member 20 has already been disengaged from the first fixing hole 140, the slide block 34 could move from the position as shown in FIG. 5 to a position where the second section 341 is aligned with the opening 121 to remind the user of detaching the battery 14 from the main body 12 for completing the battery detaching operation of the portable electronic device 10.

To be noted, if the user does not detach the battery 14 from main body 12 when the protruding rod 200 moves to the position as shown in FIG. 6, the elastic force of the second transverse elastic member 30 could keep driving the second rod member 28 to insert into the second fixing hole 141 as shown in FIG. 7 since the protruding rod 200 would continue moving to the transverse rail 180 along the oblique rail 181, so as to make the battery 14 fixed to the main body 12. In this condition, if the user wants to detach or replace the battery 14, the user just needs to press the button 22 as shown in FIG. 7. With downward movement of the button 22, the second rod member 28 could move to be disengaged from the second fixing hole 141 of the battery 14 by the inclined-surface portion 280 of the second rod member 28 slidably cooperating with the inclined-surface end 221 of the button 22. At the same time, the second rod member 28 could also push the first rod member 20 to insert into the first fixing hole 140 of the battery 14 so as to make the protruding rod 200 of the first rod member 20 move along the transverse rail 180.

As shown in FIG. 8, when the protruding rod 200 moves to a position as shown in FIG. 8, where the first rod member 20 has not inserted into the first fixing hole 140 yet and the second rod member 28 has already been disengaged from the second fixing hole 141, the slide block 34 could move with downward movement of the button 22 from the position as shown in FIG. 7 to the position where the second section 341 is aligned with the opening 121, so as to remind the user of detaching the battery 14 from the main body 12 for completing the battery detaching operation of the portable electronic device 10.

On the other hand, the user could keep pressing the button 22 instead of detaching the battery 14 from the main body 12 to make the protruding rod 200 of the first rod member 20 move past the first blocking part 183 to the incurve rail 182 (as shown in FIG. 9). During the aforesaid process, the first transverse elastic member 26 is in a compressed state due to downward movement of the button 22, the second rod member moves to a position as shown in FIG. 9 with downward movement of the button 22, and the second transverse elastic member 28 is in a compressed state with transverse movement of the second rod member 28.

Subsequently, the user could stop pressing the button 22, so that the elastic force of the first transverse elastic member 26 could drive the first rod member 20 to be disengaged from the first fixing hole 140 and the elastic force of the second transverse elastic member 30 could drive the second rod member 20 to insert into the second fixing hole 141. Accordingly, the protruding rod 200 could move along the oblique rail 181 from the position as shown in FIG. 9 with movement of the first rod member 20 to the position as shown in FIG. 2 where the protruding rod 200 is engaged with the incurve rail 182. Via engagement of the protruding rod 200 and the incurve rail 182 and positioning of the first linkage rod 24 in the oblique slot 220, the first rod member 20 and the second rod member 28 could be positioned in the first fixing hole 140 and the second fixing hole 141 respectively. At this time, as shown in FIG. 2, the button 22 could be retracted in the button hole 120, so as to prevent the user from accidentally pressing the button 22.

It should be mentioned that the aforesaid design of utilizing an elastic member (i.e. the first transverse elastic member 26 and the second transverse elastic member 30) to provide elastic force is not limited to the aforesaid embodiment. That is, all designs of utilizing elastic force provided by an elastic member to drive the aforesaid rod member could be utilized by the present invention. For example, in other embodiment, the first transverse elastic member 26 could be in a stretched state with transverse movement of the first rod member 20 for providing elastic force to the first rod member 20, and the second transverse elastic member 30 could be in a stretched state with transverse movement of the second rod member 28 for providing elastic force to the second rod member 28. As for other description for this embodiment, it could be reasoned according to the aforesaid embodiment and therefore omitted herein.

Compared with the prior art, the present invention utilizes the guiding design that the protruding rod of the rod member could move along the transverse rail, the incurve rail, and the oblique rail of the rail member and the linkage design that the inclined-surface end of the button slidably cooperates with the inclined-surface portion of the second rod member and the second rod member abuts against the first rod member, to make the button retracted in the button hole of the main body when the battery is fixed to the main body and drive the first rod member and the second rod member to be engaged with or disengaged from the first fixing hole and the second fixing hole of the battery respectively. In such a manner, the battery fixing mechanism provided by the present invention could prevent the user from accidentally pressing the button while operating or carrying the portable electronic device. Furthermore, via the aforesaid simple linkage and guiding designs, the present invention could allow the user to easily complete the battery detaching operation by pressing one single button, so as to solve the prior art problem that the linkage design of the battery fixing mechanism is too complicated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
    a main body having a button hole;
    a battery detachably disposed at a side of the main body and having a first fixing hole and a second fixing hole; and
    a battery fixing mechanism comprising:
        a button movably disposed through the button hole of the main body and having an oblique slot formed therein and an inclined-surface end;
        a rail member movably disposed in the main body in a longitudinal direction and having a transverse rail, an oblique rail, and an incurve rail;
        a first rod member movably disposed in the main body corresponding to the rail member and having a protruding rod, the protruding rod inserting into the rail member, the rail member moving longitudinally to make the first rod member move transversely to be engaged with or disengaged from the first fixing hole when the protruding rod moves in the transverse rail, the oblique rail, or the incurve rail;
        a first linkage rod pivoted to the first rod member and movably disposed in the oblique slot for being positioned in the oblique slot when the button is pressed to make the protruding rod engaged with the incurve rail;
        a first transverse elastic member disposed on the first rod member for providing elastic force to the first rod member to drive the protruding rod from the transverse rail to be engaged with the incurve rail, so as to make the button retracted in the button hole or move back to the transverse rail along the oblique rail;
        a second rod member having an inclined-surface portion and abutting against the first rod member, the inclined-surface end slidably cooperating with the inclined-surface portion to make the second rod member move transversely to be engaged with or disengaged from the second fixing hole, the second rod member pushing the first rod member to make the protruding rod move along the transverse rail or from the incurve rail to the inclined rail; and
        a second transverse elastic member disposed on the second rod member for providing the second rod member with elastic force so as to drive the second rod member to be engaged with the second fixing hole.

2. The portable electronic device of claim 1, wherein the battery fixing mechanism further comprises:
    at least one longitudinal elastic member disposed on the rail member for providing elastic force to make the rail member move longitudinally relative to the main body.

3. The portable electronic device of claim 1, wherein the rail member further has a first blocking part, and the first blocking part is disposed at a position where the transverse rail is communicated with the incurve rail for preventing the protruding rod from moving back to the transverse rail.

4. The portable electronic device of claim 3, wherein the rail member further has a second blocking part, and the second blocking part is disposed at a position where the incurve rail is communicated with the oblique rail for preventing the protruding rod from moving back to the incurve rail.

5. The portable electronic device of claim 4, wherein the first blocking part and the second blocking part are an oblique blocking sheet respectively.

6. The portable electronic device of claim 1, wherein an opening is formed at a side of the button hole, and the battery fixing mechanism further comprises:
    a slide block slidably disposed in the main body corresponding to the opening and having a first section and a second section; and
    a second linkage rod pivoted to the button and the slide block respectively for driving the slide block from a position where the first section is aligned with the opening to a position where the second section is aligned with the opening when the button moves to make the protruding rod move toward the incurve rail along the transverse rail or move toward the transverse rail along the oblique rail for driving the first rod member and the second rod member to be disengaged from the first fixing hole and the second fixing hole respectively.

7. A battery fixing mechanism for a portable electronic device, the portable electronic device comprising a main body and a battery, the main body having a button hole, the battery being detachably disposed at a side of the main body and having a first fixing hole and a second fixing hole, a battery fixing mechanism comprising:
- a button movably disposed through the button hole of the main body and having an oblique slot formed therein and an inclined-surface end;
- a rail member movably disposed in the main body in a longitudinal direction and having a transverse rail, an oblique rail, and an incurve rail;
- a first rod member movably disposed in the main body corresponding to the rail member and having a protruding rod, the protruding rod inserting into the rail member, the rail member moving longitudinally to make the first rod member move transversely to be engaged with or disengaged from the first fixing hole when the protruding rod moves in the transverse rail, the oblique rail, or the incurve rail;
- a first linkage rod pivoted to the first rod member and movably disposed in the oblique slot for being positioned in the oblique slot when the button is pressed to make the protruding rod engaged with the incurve rail;
- a first transverse elastic member disposed on the first rod member for providing elastic force to the first rod member to drive the protruding rod from the transverse rail to be engaged with the incurve rail, so as to make the button retracted in the button hole or move back to the transverse rail along the oblique rail;
- a second rod member having an inclined-surface portion and abutting against the first rod member, the inclined-surface end slidably cooperating with the inclined-surface portion to make the second rod member move transversely to be engaged with or disengaged from the second fixing hole, the second rod member pushing the first rod member to make the protruding rod move along the transverse rail or from the incurve rail to the inclined rail; and
- a second transverse elastic member disposed on the second rod member for providing the second rod member with elastic force so as to drive the second rod member to be engaged with the second fixing hole.

8. The battery fixing mechanism of claim 7 further comprising:
- at least one longitudinal elastic member disposed on the rail member for providing elastic force to make the rail member move longitudinally relative to the main body.

9. The battery fixing mechanism of claim 7, wherein the rail member further has a first blocking part, and the first blocking part is disposed at a position where the transverse rail is communicated with the incurve rail for preventing the protruding rod from moving back to the transverse rail.

10. The battery fixing mechanism of claim 9, wherein the rail member further has a second blocking part, and the second blocking part is disposed at a position where the incurve rail is communicated with the oblique rail for preventing the protruding rod from moving back to the incurve rail.

11. The battery fixing mechanism of claim 10, wherein the first blocking part and the second blocking part are an oblique blocking sheet respectively.

12. The battery fixing mechanism of claim 7, wherein an opening is formed at a side of the button hole, and the battery fixing mechanism further comprises:
- a slide block slidably disposed in the main body corresponding to the opening and having a first section and a second section; and
- a second linkage rod pivoted to the button and the slide block respectively for driving the slide block from a position where the first section is aligned with the opening to a position where the second section is aligned with the opening when the button moves to make the protruding rod move toward the incurve rail along the transverse rail or move toward the transverse rail along the oblique rail for driving the first rod member and the second rod member to be disengaged from the first fixing hole and the second fixing hole respectively.

* * * * *